United States Patent
Shaw et al.

[19]

[11] Patent Number: 6,016,635
[45] Date of Patent: Jan. 25, 2000

[54] SURFACE SEEDED AGGREGATE AND METHOD OF FORMING THE SAME

[76] Inventors: Lee A. Shaw, 2672 Crestview Dr., Newport Beach, Calif. 92663; Ronald D. Shaw, 1401 Outrigger, Corona Del Mar, Calif. 92625

[21] Appl. No.: 09/274,119

[22] Filed: Mar. 23, 1999

[51] Int. Cl.[7] ..................................................... E04B 1/16
[52] U.S. Cl. .......................... 52/741.41; 52/181; 52/414; 52/742.14; 264/31
[58] Field of Search ....................... 52/181, 414, 741.41, 52/742.14; 264/31, 69, 139; 425/456; 427/202, 203, 204

[56] References Cited

U.S. PATENT DOCUMENTS

| | | |
|---|---|---|
| 1,728,936 | 8/1929 | Johnson . |
| 2,200,433 | 5/1940 | Ripley . |
| 2,275,272 | 3/1942 | Scripture, Jr. . |
| 2,277,203 | 3/1942 | Boult . |
| 2,296,453 | 8/1942 | Saffert . |
| 2,746,365 | 5/1956 | Darneille . |
| 3,334,555 | 8/1967 | Nagin et al. . |
| 4,115,976 | 9/1978 | Rohrer . |
| 4,146,599 | 3/1979 | Lanzetta . |
| 4,443,496 | 4/1984 | Obitsu et al. . |
| 4,496,504 | 1/1985 | Steenson et al. . |
| 4,662,972 | 5/1987 | Thompson . |
| 4,748,788 | 6/1988 | Shaw et al. . |
| 5,226,279 | 7/1993 | Rendon-Herrero . |
| 5,246,650 | 9/1993 | Clark ............................................ 264/87 |
| 5,441,677 | 8/1995 | Phillps, Sr. .................................. 264/31 |
| 5,494,729 | 2/1996 | Henry et al. . |
| 5,645,664 | 7/1997 | Clyne . |
| 5,794,401 | 8/1998 | Shaw et al. . |

OTHER PUBLICATIONS

Sinak Corporation; Product Information Sheet; 2 pages.
American Access Co,; 6 pages.
Ardex Onc., Self–Leveling Toppings and Underlayments; 4 pages.
Schwing America Inc.; Truck or Trailer Mounted Concrete Pump; 4 pages.
Mayco Pump Corp.; The ST Series of Mid Range Concrete Pumps; 4 pages.
L.M. Scofield Company; Lithotex Top Surface Retarder; 1985; 1 page.
Concrete Prodducts; Integral Color in Concrete; 5 pages.
Concrete Information; Finishing Concrete Slabs, Exposed Aggregate, Patterns, and Colors; 9 pages.
Journal of the American Concrete Institute; Cement–Aggregate Reaction in Concrete; 36 pages.
Color & Texture; Introduction to Surface Esthetics; 33 pages.

*Primary Examiner*—Christopher T. Kent
*Attorney, Agent, or Firm*—Stetina Brunda Garred & Brucker

[57] ABSTRACT

An improved method of producing surface seeded exposed aggregate concrete upon a subgrade. The method comprises the initial step of pouring a concrete mixture over the subgrade, which is followed by the step of finishing the exposed surface defined by the concrete mixture with a vibrating metal bull float to dispose a quantity of cement/fines paste derived from the concrete mixture at the exposed surface thereof. Thereafter, a quantity of aggregate is broadcast upon the exposed surface of the concrete mixture and subsequently mixed into the quantity of cement/fines paste thereof via the vibrating metal bull float. The exposed surface of the concrete mixture is then finished with a power trowel to facilitate an even distribution of the quantity of aggregate within the quantity of cement/fines paste, which is followed by the application of a surface retarder to the exposed surface of the concrete mixture. The exposed surface of the concrete mixture is then finished with the power trowel to massage the surface retarder into the quantity of cement/fines paste having the quantity of aggregate mixed therein.

20 Claims, 1 Drawing Sheet

SURFACE SEEDED AGGREGATE AND METHOD OF FORMING THE SAME

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to concrete, and more particularly to surface seeded exposed aggregate concrete and a method of forming the same.

As is well known in the building and construction trade, concrete is extensively utilized as a building material for industrial, commercial and residential applications. Due to its durability, wear resistance and cost economy, concrete is currently gaining widespread use in flooring applications. With this widespread use, the public is currently demanding variations in color and surface texture of concrete such that the concrete possesses improved aesthetics similar to more conventional and costly flooring surfaces such as marble, stone and granite.

To meet this demand, the concrete trade has previously developed various coloring and surface finishing techniques to enhance the aesthetics of the concrete. Examples of such finishing techniques include salt finish, multiple broom finish, form press finish (e.g., stamped concrete), and exposed aggregate finish.

With particular regard to exposed aggregate finishes, one of two different production methods or techniques are typically utilized to form the same, i.e., the integrally exposed aggregate method and the surface seeded exposed aggregate method. The more conventional of these two techniques is the integrally exposed aggregate method which comprises the washing or removal of the surface cement and fines from the concrete while the concrete surface is still plastic (i.e., before full curing) such that the aggregate (which is normally rock or gravel) is left exposed on the surface of the concrete. Due to the normal size of such concrete aggregate being relatively large (i.e., approximately one-half to one inch in mean diameter) as well as the washing process not being uniform in nature, the resultant concrete surface derived by the integrally exposed aggregate method is extremely rough and jagged, thereby limiting its widespread use in flooring applications.

More recently, the surface seeded exposed aggregate method has been introduced into the trade. In this particular method, subsequent to the pouring of the concrete, rock or gravel aggregate is broadcast (i.e., seeded) over the top surface of the concrete and subsequently troweled into the same. Upon the curing of the concrete, the aggregate broadcast over the top surface thereof is adhered thereto and thus exposed. Although various size aggregate can be broadcast over the top surface of the concrete in the surface seeded exposed aggregate method, such aggregate is normally of about a three-eighths inch diameter or greater mean size having sheared or jagged edges such that the same can be worked into the top surface of the concrete and adequately adhered thereto. Thus, the resultant concrete surface, although being flatter and not possessing as many surface irregularities as the integrally exposed aggregate surface, still possesses an extremely rough surface which limits its widespread use in flooring applications.

In recognition of the above-described deficiency, attempts have been made in the prior art to reduce the size of the aggregate exposed on the surface of the concrete. However, such proposed solutions have typically failed due to the inability in adhering such smaller aggregate to the concrete surface. In this regard, as the aggregate size diminishes, it has been extremely difficult to insure that the aggregate will be adequately maintained upon the surface of the concrete for a prolonged duration and with substantial uniformity.

To overcome this deficiency, Applicant developed an improved exposed aggregate concrete finishing technique which maintains sufficient flatness and possesses minimal surface roughness so as to be suitable for pedestrian high traffic flooring applications. This technique is described in Applicant's U.S. Pat. No. 4,748,788 entitled SURFACE SEEDED EXPOSED AGGREGATE CONCRETE AND METHOD OF PRODUCING SAME, the disclosure of which is incorporated herein by reference. Though Applicant's technique as described in U.S. Pat. No. 4,748,788 overcame many of the deficiencies of the prior art surface seeded exposed aggregate method, Applicant has now developed improvements to such technique which facilitate a more even and uniform top surface texture and greater adhesion of the aggregate thereto. This refined technique allows materials including glass bead and silica sand to be used as the aggregate. These and other advantages related to the present invention will be described in more detail below.

SUMMARY OF THE INVENTION

In accordance with the present invention, there is provided a method of producing surface seeded exposed aggregate concrete upon a subgrade. The method comprises the initial step of pouring a concrete mixture over the subgrade, with the concrete mixture defining an upper exposed surface when poured. Prior to the concrete mixture being poured thereover, the subgrade is preferably prepared to a desired grade. Such preparation preferably comprises compacting the subgrade to approximately 90% compaction. The compaction of the subgrade may be followed by the placement of a layer of sand thereupon, and the subsequent placement of reinforcement members (e.g., rebar) upon the layer of sand. When the layer of sand and reinforcement members are provided with the prepared subgrade, the concrete mixture is poured over the layer of sand and the reinforcement members such that the reinforcement members are encapsulated therewithin.

After the concrete mixture has been poured, the same is preferably screeded to a desired grade, which is followed by the step of finishing the exposed surface of the concrete mixture with a vibrating metal bull float to dispose a quantity of cement/fines paste derived from the concrete mixture at the exposed surface thereof. The finishing of the exposed surface via the vibrating metal bull float in this particular step also seals the exposed surface. It is contemplated that this initial finishing step may be completed through the use of either a vibrating magnesium bull float or a vibrating aluminum bull float. A preferred metal bull float is sold under the trademark HAL 200 by the Lievers Holland company.

Subsequent to the completion of the initial finishing step, a quantity of aggregate is broadcast upon the exposed surface of the concrete mixture. The aggregate may comprise silica sand, glass bead, coarse sand (e.g., Monterey Aquarium coarse sand), organic materials (e.g., sea shells), metals, or composite materials. The quantity of aggregate is preferably broadcast over the exposed surface of the concrete mixture at an approximate rate of one pound per square foot of the concrete mixture.

After being broadcast upon the exposed surface of the concrete mixture, the quantity of aggregate is then preferably mixed into the quantity of cement/fines paste through the use of the vibrating metal bull float. As indicated above, the vibrating metal bull float used in the mixing step may comprise either a vibrating magnesium bull float or a vibrating aluminum bull float. Importantly, this mixing step is used to fully embed the quantity of aggregate into the quantity of cement/fines paste.

Subsequent to the mixing of the quantity of aggregate into the quantity of cement/fines paste, the exposed surface of the concrete mixture is finished with a power trowel to facilitate an even distribution of the aggregate within the cement/fines paste. Thereafter, a surface retarder is applied to the exposed surface of the concrete mixture. The application of the surface retarder to the exposed surface is followed by the step of finishing the exposed surface of the concrete mixture with the power trowel to massage the surface retarder into the cement/fines paste having the aggregate mixed therein. More particularly, this finishing step preferably results in the penetration of the surface retarder into the cement/fines paste a distance greater than the mean diameter of the aggregate therein. Advantageously, this particular finishing step conducted subsequent to the application of the surface retarder to the exposed surface of the concrete mixture eliminates hard spots in the resultant concrete by facilitating a full mix of the retarder and cement/fines paste. The power trowel preferably used in relation to both this and the previous mixing step finishes the exposed surface of the concrete mixture in a circular motion.

Subsequent to the surface retarder being massaged into the cement/fines paste, a vapor barrier is preferably formed on the exposed surface of the concrete mixture. In the preferred embodiment, the formation of the vapor barrier is facilitated by the application of an evaporation reducer to the exposed surface of the concrete mixture. A preferred evaporation reducer is sold under the trademark CONFILM by the Concrete Tie company of Compton, Calif. After a prescribed period of time (e.g., from 2 to 24 hours) subsequent to the application of the evaporation reducer to the exposed surface of the concrete mixture, the surface films are washed therefrom. This washing step is preferably accomplished by applying water to the exposed surface of the concrete mixture, and thereafter lightly brushing the exposed surface. This brushing step is preferably conducted so as to remove no more than about 5% of the quantity of aggregate from the exposed surface of the concrete mixture. Advantageously, the full mixture of the retarder and cement/fines paste accomplished through the use of the power trowel subsequent to the application of the surface retarder to the exposed surface of the concrete mixture significantly aides in the elimination of perimeter wear-down and excessive aggregate dislodgment and loss during this initial washing step. Additionally, the application of the liquid evaporation reducer to the exposed surface which prevents hydration of the concrete mixture and reduces the rate of evaporation of moisture therefrom increases the ease at which excess cement/fines paste and residual surface retarder are washed from the exposed surface during this initial washing step.

After the surface films have been washed from the exposed surface thereof, the concrete mixture is then fully cured. The curing of the concrete mixture may be accomplished through the use of fogger or through the use of a soaker hose, though other methods may also be employed to facilitate the curing process. Upon the completion of the curing of the concrete mixture, the exposed surface thereof is washed to remove surface residue therefrom. In the preferred embodiment, the exposed surface of the concrete mixture is washed with a mixture of water and muriatic acid.

BRIEF DESCRIPTION OF THE DRAWINGS

These, as well as other features of the present invention, will become more apparent upon reference to the drawings wherein.

DETAILED DESCRIPTION OF THE INVENTION

Figure 1:
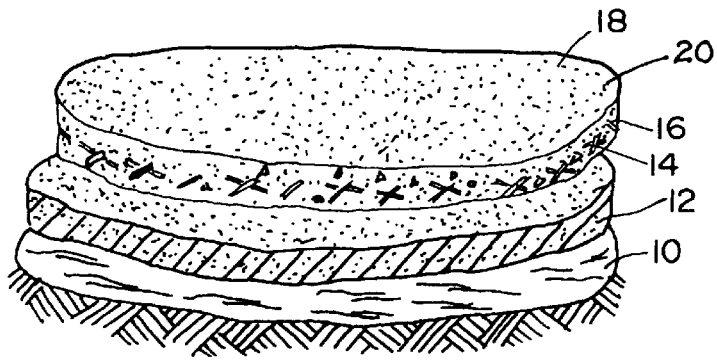
FIG. 1 is an exploded, partial perspective cross-sectional view of the surface seeded exposed aggregate concrete of the present invention.
Figure 2:
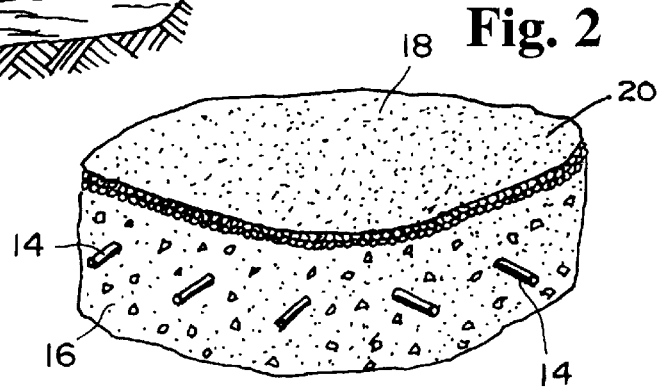
FIG. 2 is an enlarged partial perspective cross-sectional view of the concrete mixture of the surface seeded exposed aggregate concrete of the present invention, illustrating the exposed aggregate thereon.
Figure 3:
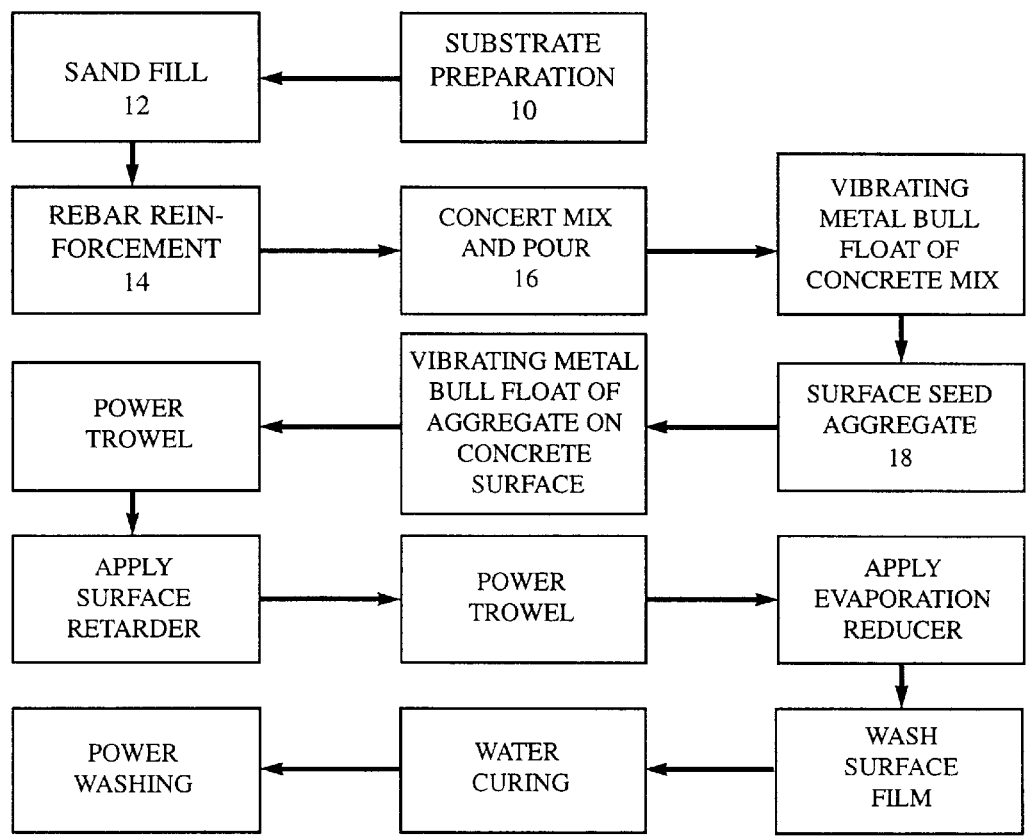
FIG. 3 is a schematic flow diagram of the manipulative steps utilized in producing the surface seeded exposed aggregate concrete of the present invention.

Referring now to FIGS. 1–3, pictorially and schematically illustrated is the surface seeded exposed aggregate concrete of the present invention, and the method of producing the same. The preferred method comprises the initial step of preparing the subgrade 10 to a desired elevation and grade. Such preparation preferably comprises compacting the subgrade 10 to approximately 90% compaction. Subsequent to being compacted, the subgrade 10 is preferably covered with a layer of clean, moist fill sand 12 which is preferably maintained at a minimum four inch thickness. Although the fill sand 12 is not absolutely necessary for the method of producing the surface seeded aggregate concrete of the present invention, it is highly desirable to control the hydration process of the concrete. In order to increase the resultant strength of the concrete and reduce subsequent cracking of the same, reinforcement members 14 such as wire mesh or rebar is/are positioned upon the layer of fill sand 12.

With the reinforcement members 14 in place, a concrete mix or mixture 16 is poured over the layer of fill sand 12 and the reinforcement members 14 such that the reinforcement members 14 are encapsulated therewithin. The concrete mixture 16 is poured to approximately a three and one-half to four inch thickness. Although variations in the concrete mixture 16 are clearly contemplated, a preferred concrete mixture 16 comprises 70% sand and 30% three-eighth inch mean diameter aggregate combined with six sack cement (two thousand pounds per square inch) or seven sack cement (three thousand pounds per square inch) Dependent upon individual desires, various color mixtures can be added to the concrete mixture 16. An exemplary color which may be utilized in the present invention is Color No. C1215 manufactured by L. M. Scoffield of Los Angeles, Calif., though other conventional color mixtures may also be employed in relation to the present invention.

After the concrete mixture 16 has been poured, the same is preferably screeded to a desired level plane or grade. The screeding of the concrete mixture 16 results in the same defining a generally level or planar upper exposed surface 18. In the present invention, the concrete mixture 16 is not tamped as is conventional in the art. In this respect, it has been determined that tamping should be avoided in the present invention so as not to bring up too much cement/fines in the concrete mixture 16 which would be prohibitive for the subsequent surface seeding of the exposed aggregate thereupon. Rather, subsequent to screeding, the exposed surface 18 of the concrete mixture 16 is surfaced or finished with a vibrating metal bull float to dispose a quantity of cement/fines paste derived from the concrete mixture 16 at the exposed surface 18 thereof. Such vibrating metal bull floats are known in the art and are characterized by possessing an extremely smooth or polished surface which, in addition to bringing up the appropriate amount of cement/fines paste for the subsequent manipulative steps of the present invention, also tends to seal the exposed surface 18 of the concrete mixture 16. It is contemplated that this initial finishing step may be completed through the use of either a vibrating magnesium bull float or a vibrating aluminum bull float. As indicated above, a preferred metal bull float is sold under the trademark HAL 200 by the Lievers Holland company.

When the upper exposed surface 18 of the concrete mixture 16 is still plastic, small size exposed aggregate 20 is broadcast over the exposed surface 18. The aggregate 20 may comprise silica sand, glass bead, coarse sand (e.g., Monterey Aquarium coarse sand), organic materials (e.g., sea shells), metals, or composite materials. It is preferred that any aggregate 20 employed in the present invention be characterized by having a mean average diameter size of approximately one-eighth inch diameter, and further be characterized by possessing a generally rounded external surface configuration. Such small size aggregate 20 is a substantial departure over prior art surface seeded exposed aggregates which typically comprise rock or gravel aggregate having average mean diameters of three-eighths of an inch or greater and are characterized by rough, jagged exterior surfaces. Typically, the aggregate 20 is broadcast over the exposed surface 18 of the concrete mixture 16 by use of square point shovels and is applied at a preferred rate of approximately one pound per square foot of the exposed surface 18 of the concrete mixture 16. It is preferred that the aggregate 20 should not initially depress below the exposed surface 18 of the concrete mixture 16, but rather should be broadcast solely to cover the same.

After being broadcast upon the exposed surface 18 of the concrete mixture 16, the aggregate 20 is mixed or worked into the exposed surface 18 of the concrete mixture 16, and more particularly is mixed into the quantity of cement/fines paste at the exposed surface 18 through the use of the above-described vibrating metal bull float. As indicated above, this vibrating metal bull float may comprise either a vibrating magnesium bull float or a vibrating aluminum bull float. This mixing of the aggregate 20 with the cement/fines paste at the exposed surface 18 derived during the previous vibrating metal bull float step is critical to the process of the present invention and insures that the aggregate 20 is fully embedded into the cement/fines paste, and thus thoroughly adhered or bonded to the exposed surface 18 of the concrete mixture 16 upon resultant curing.

Subsequent to the mixing of the aggregate 20 into the cement/fines paste at the exposed surface 18 of the concrete mixture 16, the exposed surface 18 is finished with a power trowel to facilitate an even distribution of the aggregate 20 within the cement/fines paste. Thereafter, a chemical surface retarder is sprayed upon the exposed surface 18 to uniformly cover the same. The chemical retarder slows down the hydration process of the concrete mixture 16. The application of the surface retarder to the exposed surface 18 is followed by the step of finishing the exposed surface 18 of the concrete mixture 16 with the power trowel to massage the surface retarder into the cement/fines paste having the aggregate 20 mixed therein. This finishing step preferably results in the penetration of the surface retarder into the cement/fines paste a distance of at least approximately three-eighths of an inch which, due to the relatively small size the aggregate 20 therein, is below the maximum depth of the aggregate 20. The chemical retarder slows down the hydration process of the concrete mixture 16. Advantageously, this particular finishing step conducted subsequent to the application of the surface retarder to the exposed surface 18 of the concrete mixture 16 eliminates hard spots in the resultant concrete by facilitating a full mix of the retarder and cement/fines paste. The power trowel preferably used in relation to both this and the previous mixing step finishes the exposed surface 18 of the concrete mixture 16 in a generally circular motion. Although various conventional surface retarders may be utilized, one superior surface retarder is designated as SPEC AE manufactured by the E.L. Moore Co. of Costa Mesa, Calif.

Subsequent to the surface retarder being massaged into the cement/fines paste, a vapor barrier is preferably formed on the exposed surface 18 of the concrete mixture 16. In the preferred embodiment, the formation of the vapor barrier is facilitated by the application of a liquid chemical evaporation reducer to the exposed surface 18 of the concrete mixture 16. A preferred evaporation reducer is sold under the trademark CONFILM by the Concrete Tie company of Compton, California. An alternative vapor barrier may be formed by covering the exposed surface 18 with four or six mill visqueen. The vapor barrier is maintained upon the exposed surface 18 of the concrete mixture 16 for a prescribed period of time, which may range from approximately two to twenty-four hours.

After the vapor barrier has remained upon the exposed surface 18 for a prescribed period of time, the exposed surface 18 of the concrete mixture 16 is washed with water to remove any surface films therefrom. In this washing procedure, it is additionally preferable to lightly bristle brush the exposed surface 18 wherein preferably no more than about 5 % of the aggregate 20 is dislodged and removed therefrom. The extremely low percentage (i.e., less than 5%) removal of the aggregate 20 from the exposed surface 18 evidences the extremely strong adherence of the aggregate 20 to the exposed surface 18 of the concrete mixture 16. Advantageously, the full mixture of the retarder and cement/fines paste accomplished through the use of the power trowel subsequent to the application of the surface retarder to the exposed surface 18 of the concrete mixture 16 significantly aides in the elimination of perimeter weardown and excessive dislodgement and loss of the aggregate 20 during this initial washing step. Additionally, the application of the liquid evaporation reducer to the exposed surface 18 which prevents hydration of the concrete mixture 16 and reduces the rate of evaporation of moisture therefrom increases the ease at which excess cement/fines paste and residual surface retarder are washed from the exposed surface 18 during this initial washing step.

Subsequent to washing, the concrete mixture 16 is cured with water only as opposed to chemical curing agents to avoid any staining of the same, with such water curing typically being facilitated through the use of a conventional fogger or soaker hose. After a prescribed period of time (e.g., 30 days after initiating the curing process) any surface residue present on the exposed surface 18 is removed by conventional power washing with a 90% steam and 10% muriatic acid mixture which is applied by a power washer via a high pressure nozzle.

The resultant surface seeded exposed aggregate concrete exhibits an extremely flat exposed aggregate surface which is suitable for extremely high pedestrian traffic flooring applications. Additionally, the surface color and texture may be such that it approximates the surface color and texture of more conventional flooring surfaces such as stone, granite and marble. This resemblance can further be accentuated by saw cutting the concrete surface into rectangular grids to give the appearance that the individual rectangular squares of the grid were laid in a manner analogous to stone, granite or marble flooring. Thus, the present invention comprises a significant improvement in the art by providing a surface seeded exposed aggregate concrete wherein due to the extremely small diameter size of the aggregate 20 thereon, possesses a surface texture and color having improved aesthetics over the prior art. Moreover, in those instances when glass bead is used as the aggregate 20, the resultant concrete exhibits properties of luminescence when struck by sunlight at a particular angle of incidence (e.g., a thirty degree angle).

Additional modifications and improvements of the present invention may also be apparent to those of ordinary skill in the art. Thus, the particular combination of parts and steps described and illustrated herein is intended to represent only one embodiment of the present invention, and is not intended to serve as limitations of alternative devices and methods within the spirit and scope of the invention.

What is claimed is:

1. A method of producing surface seeded exposed ggregate concrete upon a subgrade, the method comprising he steps of:
   (a) pouring a concrete mixture over the subgrade, the concrete mixture defining an exposed surface when poured;
   (b) finishing the exposed surface of the concrete mixture with a vibrating metal bull float to dispose a quantity of cement/fines paste derived from the concrete mixture at the exposed surface thereof;
   (c) broadcasting a quantity of aggregate upon the exposed surface of the concrete mixture;
   (d) mixing the quantity of aggregate into the quantity of cement/fines paste via the vibrating metal bull float;
   (e) finishing the exposed surface of the concrete mixture with a power trowel to facilitate an even distribution of the quantity of aggregate within the quantity of cement/fines paste;
   (f) applying a surface retarder to the exposed surface of the concrete mixture; and
   (g) finishing the exposed surface of the concrete mixture with the power trowel to massage the surface retarder into the quantity of cement/fines paste having the quantity of aggregate mixed therein.

2. The method of claim 1 further comprising the steps of:
   (h) forming a vapor barrier on the exposed surface of the concrete mixture;
   (i) washing surface films from the exposed surface of the concrete mixture;
   (j) curing the concrete mixture; and
   (k) washing the exposed surface of the concrete mixture to remove surface residue therefrom.

3. The method of claim 1 wherein step (a) comprises reparing the subgrade to a desired grade prior to pouring he concrete mixture thereover.

4. The method of claim 3 wherein step (a) comprises compacting the subgrade to approximately 90% compaction.

5. The method of claim 3 wherein step (a) further comprises the steps of:
   (1) placing a layer of sand upon the prepared subgrade;
   (2) placing reinforcement members upon the layer of sand; and
   (3) pouring the concrete mixture over the layer of sand and the reinforcement members such that the reinforcement members are encapsulated by the concrete mixture.

6. The method of claim 1 wherein step (b) comprises screeding the concrete mixture to a desired grade prior to finishing the exposed surface thereof with the vibrating metal bull float.

7. The method of claim 1 wherein steps (b) and (d) are completed through the use of a vibrating magnesium bull float.

8. The method of claim 1 wherein steps (b) and (d) are completed through the use of a vibrating aluminum bull float.

9. The method of claim 1 wherein step (c) comprises broadcasting a quantity of silica sand upon the exposed surface of the concrete mixture.

10. The method of claim 1 wherein step (c) comprises broadcasting a quantity of glass bead upon the exposed surface of the concrete mixture.

11. The method of claim 1 wherein step (c) comprises broadcasting the quantity of aggregate over the exposed surface of the concrete mixture at an approximate rate of one pound per square foot of the concrete mixture.

12. The method of claim 1 wherein steps (e) and (g) comprise finishing the exposed surface of the concrete mixture in a circular motion through the use of the power trowel.

13. The method of claim 1 wherein step (g) comprises finishing the exposed surface of the concrete mixture such that the surface retarder penetrates into the quantity of cement/fines paste a distance greater than the mean diameter of the quantity of aggregate therein.

14. The method of claim 2 wherein step (h) comprises applying an evaporation reducer to the exposed surface of the concrete mixture.

15. The method of claim 2 wherein step (i) comprises the steps of:
   (1) applying water to the exposed surface of the concrete mixture; and
   (2) lightly brushing the exposed surface of the concrete mixture.

16. The method of claim 15 wherein step (2) is conducted so as to remove no more than about 5% of the quantity of aggregate from the exposed surface of the concrete mixture.

17. The method of claim 2 wherein step (j) comprises curing the concrete mixture through the use of a fogger.

18. The method of claim 2 wherein step (j) comprises curing the concrete mixture through the use of a soaker hose.

19. The method of claim 2 wherein step (k) comprises washing the exposed surface of the concrete mixture with a mixture of water and muriatic acid.

20. A surface seeded exposed aggregate concrete product formed by the method of claim 2.

* * * * *